Dec. 1, 1931.  E. FISCHER  1,834,774

ROTOR FOR DYNAMO ELECTRIC MACHINES

Filed March 21, 1928

Inventor:
Ernst Fischer;
by Charles E. Tulla
His Attorney

Patented Dec. 1, 1931

1,834,774

UNITED STATES PATENT OFFICE

ERNST FISCHER, OF HERMSDORF, GERMANY, ASSIGNOR TO GENERAL ELECTRIC COMPANY, A CORPORATION OF NEW YORK

ROTOR FOR DYNAMO ELECTRIC MACHINES

Application filed March 21, 1928, Serial No. 263,524, and in Germany April 5, 1927.

My invention relates to rotors for dynamo-electric machines and has for its object the provision of an improved rotor construction which can be readily fabricated in any suitable manner, such as welding, from cut or punched metal plates and bars. I do this by making the rotor of a central supporting structure having axially extending bars attached to the outer periphery thereof, and arranging a magnetic structure about the central supporting structure which is carried on the bars.

My invention will be more fully set forth in the following description referring to the accompanying drawings and the features of novelty which characterize my invention will be pointed out with particularity in the claims annexed to and forming a part of this specification.

Figure 1:
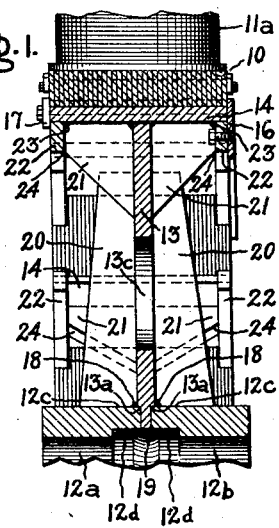
Figure 2:
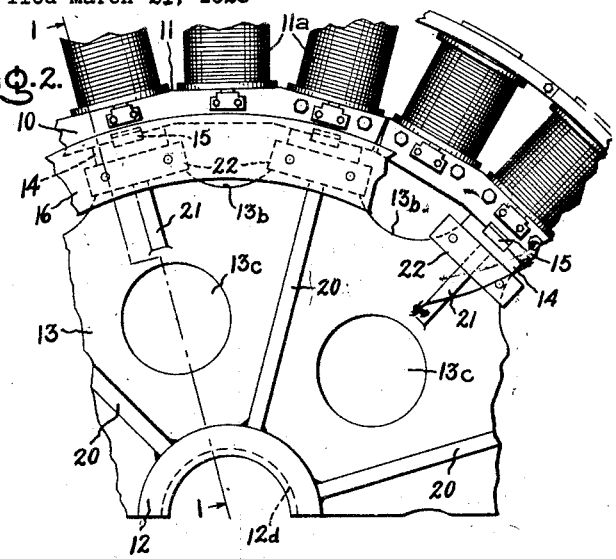
Figure 3:
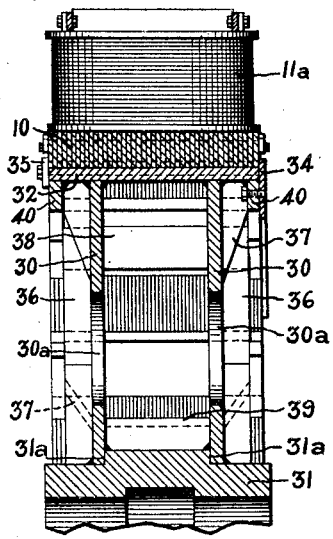
Figure 4:
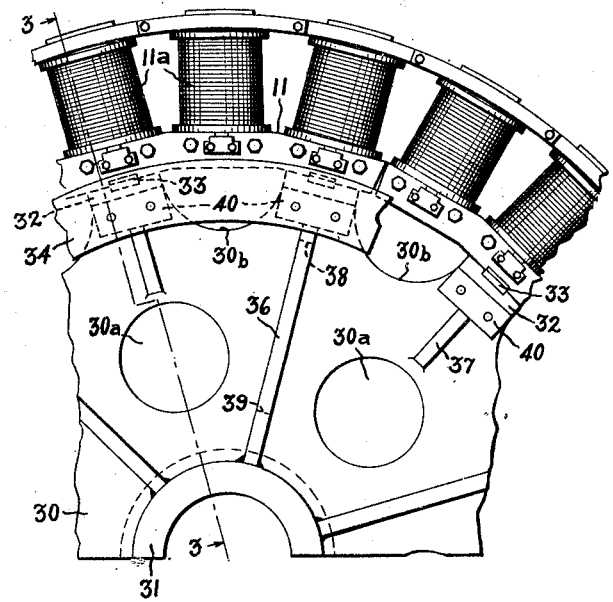

In the drawings, Fig. 1 is a section on the line 1—1 of Fig. 2 of one form of my improved rotor; Fig. 2 is a fragmentary end view of the construction shown in Fig. 1; Fig. 3 is a section on the line 3—3 of Fig. 4 of another form of my improved rotor; and Fig. 4 is an end view of the construction shown in Fig. 3.

Referring to the drawings, the two forms of my improved rotor illustrated are adapted to be mounted on a shaft in any convenient manner and in this instance each includes an annular magnetic structure 10 which is shown, by way of example, as comprising a rim 11 having pole pieces 11a mounted thereon.

In the construction shown in Figs. 1 and 2, the magnetic structure 10 is supported on a central supporting structure comprising a hub member 12 by a disk 13 having bars 14 welded to the periphery of the disk and extending axially of the rotor. In order to lighten the structure and facilitate circulation of air through the machine, the disk 13 is cut away at 13b between the bars 14 and is provided with openings 13c therein. The magnetic structure is secured to the bars 14 by means of keys 15 seated therein and retained on the keys between an annular brake plate 16 and plates 17 attached to the bars. The structure is centered with respect to the axis of the rotor by fitting the disk 13 on the hub member 12. This is done by making the hub in two parts 12a and 12b which are accurately machined at 12c to fit counterbores 13a in the disk 13, and then welding them to the disk at 18 and 19. The parts 12a and 12b are each counterbored at 12d so that the weld at 19 will not interfere with the fitting of the hub on the rotor shaft.

In order to give the rotor the necessary strength and rigidity to support the magnetic structure, stiffening webs 20 and 21 are arranged with their edges presented toward the disk. The webs 20 extend radially of the disk 13 from the hub 12 to alternate bars 14, and the webs 21 extend from the others of the bars 14 to the openings 13c in the disk. The webs 20 are welded along their edges to the hub, the disk and the bars; and the webs 21 are similarly welded to the disk and the bars. The rotor is further stiffened by plates 22 which are welded at 23 along their edges to the bars 14 and also at 24 to the edges of the webs 21.

In the form of my improved rotor shown in Figs. 3 and 4, the magnetic structure 10 is supported on a central supporting structure comprising two disks 30 spaced apart axially of the rotor which are fitted on a hub member 31 against shoulders 31a and welded thereto, so as to center the magnetic structure with respect to the axis of the rotor. The magnetic structure is mounted on the disks 30 by means of bars 32 welded to the periphery of the disks and having keys 33 seated therein on which the magnetic structure is retained between an annular brake plate 34 and plates 35. In order to facilitate the circulation of air through the machine in which the rotor is used and at the same time reduce the weight of the rotor, the disks 30 are provided with openings 30a and are also cut away at 30b between the bars 32.

The disks 30 are reinforced by stiffening webs 36 and 37 which are welded along their edges to the adjacent portions of the structure. The webs 36 extend from the hub member 31 to alternate bars 32, and the webs 37 extend from the other bars toward the openings 30a. The disks are also reinforced by webs 38 and 39 which extend between the disks 30 adjacent the bars 32 and the hub member 31, respectively, and which are welded to these parts of the structure. The bars 32 are further reinforced by blocks 40 which are welded along their edges to the ends of the bars and to the edges of the webs 36 and 37.

It will thus be seen that I have produced a rigid rotor construction which can be readily fabricated from suitable plates and bars.

Further modifications of the particular constructions shown and described will occur to those skilled in the art, so that I desire it to be understood my invention is not to be limited except as defined in the appended claims.

What I claim as new and desire to secure by Letters Patent of the United States is:—

1. A rotor for dynamo-electric machines comprising a central supporting structure including a disk having bars attached to the outer periphery thereof and extending axially of said rotor, and a magnetic structure carried by said bars.

2. A rotor for dynamo-electric machines comprising a hub member, a disk surrounding said hub member and attached thereto, a magnetic structure arranged about said disk, means for supporting said magnetic structure on said disk including bars carried thereby and extending axially of said rotor, and stiffening webs connecting said bars to said disk.

3. A rotor for dynamo-electric machines comprising a hub member, a disk surrounding said hub member and attached thereto, a magnetic structure arranged about said disk, means for supporting said magnetic structure on said disk including bars carried thereby and extending axially of said rotor, and radially arranged stiffening webs having their edges presented toward the side of said disk, each of said webs extending from said hub member to said bars and being attached to said hub member, said disk and one of said bars.

4. A rotor for dynamo-electric machines comprising a hub member, a disk surrounding said hub member and attached thereto, a magnetic structure arranged about said disk, means for supporting said magnetic structure on said disk including bars carried thereby and extending axially of said rotor, radially arranged stiffening webs having their edges presented toward the side of said disk, each of said webs being attached to said disk and one of said bars, and reinforcing blocks attached to said bars and the edges of said webs.

5. A rotor for dynamo-electric machines comprising a hub member, a disk surrounding said hub member and secured thereto, a magnetic structure arranged about said disk, means for supporting said magnetic structure on said disk including bars arranged about the periphery of said disk and secured thereto, and radially arranged stiffening webs having their edges presented toward the side of said disk, some of said webs extending from said hub member to said bars and being attached to said hub member, said disk and said bars, said disk having openings between said webs, and others of said webs extending from said bars toward said openings and being attached to said disk and said bars.

6. A rotor for dynamo-electric machines comprising a hub member, a disk fitted on said hub member to center the former with respect to the axis of the latter, a magnetic structure arranged about said disk, and means for supporting said magnetic structure on said disk including bars attached to the outer periphery of said disk and extending axially of said rotor.

7. A rotor for dynamo-electric machines comprising an annular hub member, a plurality of disks spaced apart axially of said hub member and secured thereto, a magnetic structure arranged about said disks, and means for supporting said magnetic structure on said disks including bars attached to the outer periphery of said disks and extending axially of said rotor.

8. A rotor for dynamo-electric machines comprising a hub member, a plurality of disks fitted on said hub member so as to center them with respect to the axis of said hub member, said disks being spaced apart axially of said hub member and secured thereto, an annular magnetic structure arranged about said disks, and means for supporting said magnetic structure on said disks including bars attached to the outer periphery of said disks and extending axially of said rotor.

9. A rotor for dynamo-electric machines comprising a hub member, a plurality of disks fitted on said hub member so as to center them with respect to the axis of said hub member, said disks being spaced apart axially of said hub member and secured thereto, a magnetic structure arranged about said disks, means for supporting said magnetic structure on said disks including bars carried thereby and extending axially of the rotor, and reinforcing webs connecting said bars to said disks.

10. A rotor for dynamo-electric machines comprising a hub member, a plurality of disks fitted on said hub member so as to center them with respect to the axis of said hub member, said disks being spaced apart axially of said hub member and secured thereto, a magnetic structure arranged about said disks, means for supporting said magnetic structure on said disks, including bars carried thereby and extending axially of the rotor, and radially arranged stiffening webs having their edges presented toward the side of said disks, each of said webs extending from said hub member to one of said bars and being attached to said hub member said disks and one of said bars.

11. A rotor for dynamo-electric machines comprising a hub member, a plurality of disks fitted on said hub member so as to center them with respect to the axis of said hub member, said disks being spaced apart axially of said hub member and secured thereto, a magnetic structure arranged about said disks, means for supporting a magnetic structure on said disks, including bars carried thereby and extending axially of the rotor, radially arranged stiffening webs having their edges presented toward the side of said disks, each of said webs being attached to one of said disks and one of said bars, and reinforcing blocks attached to said bars and the edges of said webs.

12. A rotor for dynamo-electric machines comprising a hub member, a plurality of disks fitted on said hub member to center them with respect to the axis of said hub member, a magnetic structure surrounding said disks, means for supporting said magnetic structure on said disks including bars arranged about the periphery of said disks and secured thereto, and radially arranged stiffening webs having their edges presented toward the side of said disks, some of said webs extending from said hub member to said bars and being attached to said hub member said disks and said bars, said disks having openings between said webs, and others of said webs extending from said bars toward said openings and being attached to said disks and said bars.

In witness whereof, I have hereunto set my hand this 3rd day of March, 1928.

ERNST FISCHER.

CERTIFICATE OF CORRECTION.

Patent No. 1,834,774.  Granted December 1, 1931, to

ERNST FISCHER.

It is hereby certified that error appears in the printed specification of the above numbered patent requiring correction as follows: Page 2, line 88, claim 7, for "an annular" read a, and in line 89 same claim, for the article "a" read an annular; and that the said Letters Patent should be read with these corrections therein that the same may conform to the record of the case in the Patent Office.

Signed and sealed this 16th day of February, A. D. 1932.

(Seal)

M. J. Moore,
Acting Commissioner of Patents.